United States Patent [19]

Anscher et al.

[11] Patent Number: 5,758,392

[45] Date of Patent: Jun. 2, 1998

[54] SNAP HOOK

[75] Inventors: Joseph Anscher, Muttontown; Raymond Cappiello, Stony Brook, both of N.Y.

[73] Assignee: National Molding Corp., Farmingdale, N.Y.

[21] Appl. No.: 868,225

[22] Filed: Jun. 3, 1997

[51] Int. Cl.[6] .................................................. A44B 13/00
[52] U.S. Cl. ...................... 24/599.9; 24/600.9; 24/601.1; 24/601.2
[58] Field of Search .................................. 24/599.9, 600.3, 24/601.1, 600.9, 599.3, 599.7, 398.1, 599.1, 600.1, 600.8, 601.2, 601.4, 601.5; 294/82.2

[56] References Cited

U.S. PATENT DOCUMENTS

| | | |
|---|---|---|
| 69,072 | 9/1867 | Butler ........................ 24/600.9 |
| 228,628 | 6/1880 | Grassick ..................... 24/599.1 |
| 1,430,824 | 10/1922 | Martin ....................... 24/599.9 |
| 4,368,999 | 1/1983 | Morel . |
| 4,464,813 | 8/1984 | Bakker et al. . |
| 5,340,004 | 8/1994 | Moore . |
| 5,517,735 | 5/1996 | Tsai . |
| 5,611,169 | 3/1997 | Mayer . |

*Primary Examiner*—Victor N. Sakran

[57] ABSTRACT

A hook adapted to be attached to an elongated cord, comprising a hook body having a base, a side and a top curved portion and a latch attached to the base portion. The free end of the latch can be releasably locked to the hook body. A flexible member extends upward from the base in between the side of the hook body and the latch so that the latch and the tongue define a space in which the cord is placed. The cord can be securely attached to the hook by placing the cord between the flexible member and the latch and then locking the latch to the hook body. Upon locking the latch, the cord cannot slide or rotate within the space and is thus securely attached to the hook. The invention also comprises an automobile cargo net on which a plurality of such hooks are attached.

11 Claims, 3 Drawing Sheets

SNAP HOOK

BACKGROUND OF THE INVENTION

1. Field of the Invention

This invention relates to a novel snap hook that is ideal for fastening to elongated cords and cables, as well as loops and other devices. In particular, the invention relates to snap hook that can be releasably attached to cords, particularly cords on automobile cargo nets, to secure the cords to other devices.

2. The Prior Art

Automobile cargo nets are often attached to the inside of an automobile trunk, and serve to keep objects in the trunk in an orderly, and safe manner. A typical example of such a cargo net is described in U.S. Pat. No. 5,340,004 to Moore. Moore shows a cargo net having two faces formed from netting material, which are supported by elastic cords along their top edges. The two ends of the net are mounted via loops onto hooks on the side of the automobile.

Along with the use of such a cargo net, it may be desirable to attach additional hooks or other devices to attach the net at its midsection to other surfaces, or to the other side of the net. Several devices have been proposed for use as additional retaining hooks, but all suffer from several drawbacks.

U.S. Pat. No. 4,464,813 to Bakker discloses a snap hook that can be used to secure elastic cords to other devices. This hook comprises a bi-ended base portion, a blade portion, a re-entrant portion and a latch portion. The latch and blade are integrally formed with the base. The latch can be locked and unlocked from the blade portion, similar to the operation of a safety pin. The re-entrant portion forms an aperture when the hook is locked for securing a cord or other device. This device suffers from the drawback that it can be too easily disengaged from the cord to which it is attached. Merely unlocking the latch to engage the hook opens the aperture and lets the cord free. This structure increases the risk of the snap hook becoming lost.

U.S. Pat. No. 5,611,169 to Mayer discloses a clip for attaching objects to a line comprising a plurality of legs forming a camming portion and a curved portion for clamping around a line. Hooks, wires or other objects can then be attached to the free end of the clip. This clip allows the user to attach it to a line without having to squeeze a spring member such as with other conventional clips. This design thus alleviates strain on the fingers, especially when multiple clips are being applied. While this device is useful for some purposes, it can become too easily disengaged from the cord to which it is attached, and thus easily lost.

U.S. Pat. No. 4,368,999 to Morel discloses a coupling end part for flexible cables comprising a cage for receiving the cable and a flexible strip that extends outwardly from the cage. A slider is slid over the cage and presses the flexible strip inward to secure the cable within the cage. This device is useful for securing to the ends of cables but is difficult to apply to the middle sections of cables or lines. To use this device to secure the middle sections, the cables must be pinched into a loop which is then forced into the cage. In addition, the two-piece assembly is costly to manufacture.

SUMMARY OF THE INVENTION

It is therefore an object of the present invention to provide a hook for attaching to a cord that can be easily and securely fastened to the cord.

It is another object of the present invention to provide a hook for attaching to a cord that can be easily manufactured by injection molding.

It is yet another object of the present invention to provide a hook for attaching to a cord or line that can be integrally formed in one piece.

These and other objects of the invention are accomplished by a hook adapted to be attached to an elongated cord, comprising a hook body having a base, a side and a top curved portion, and a latch attached to the base portion. The free end of the latch can be releasably locked to the hook body. A flexible member extends upward from the base in between the side of the hook body and the latch so that the latch and the flexible member define a space in which the cord is placed. The cord can be securely attached to the hook by placing the cord in the space between the flexible member and the latch and then locking the latch to the hook body.

The means for releasably locking the latch to the hook body preferably comprises an upwardly-extending protrusion attached to the side of the hook body and a downwardly-extending finger attached to the free end of the latch. Pressing the latch toward the hook body causes the finger to engage the protrusion and secure the latch to the hook body.

This locking can be accomplished in any known way, as long as it accomplishes the secure locking of the latch to the hook body.

In one embodiment, the flexible member has a free end. In this embodiment, there may also be a stop mounted on the hook body, which is adapted to stop movement of the flexible member toward the hook body after a certain point, when the latch is pressed toward the hook body. This feature ensures that locking the latch to the hook body compresses the space between the flexible member and the latch and thus creates a secure attachment to the cord so that the cord cannot slide or rotate within the space.

In some instances, it may be desirable to have a way to keep the hook from becoming inadvertently disengaged from a rail or beam on which it is mounted. To accomplish this, the device may also comprise a tongue mounted on the free end of the latch that extends upward toward the curved top portion.

The hook according to the invention is preferably made from a single piece of injection-molded nylon or acetal. This way, the hook is both lightweight and durable, and can be easily and inexpensively manufactured.

The invention also comprises an automobile cargo net having a flexible cord mounted around the edges of the netting. The net also comprises a plurality of hooks having the features described above mounted on the flexible cord along the edge of the cargo net.

The hooks can be used to secure the intermediate sections of the cargo net to the other side of the cargo net, or to parts of the automobile in which the net is mounted. The hooks according to the invention keep the intermediate portions of the cargo net from sagging and allowing the contents to spill out during use.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENTS

Figure 1:
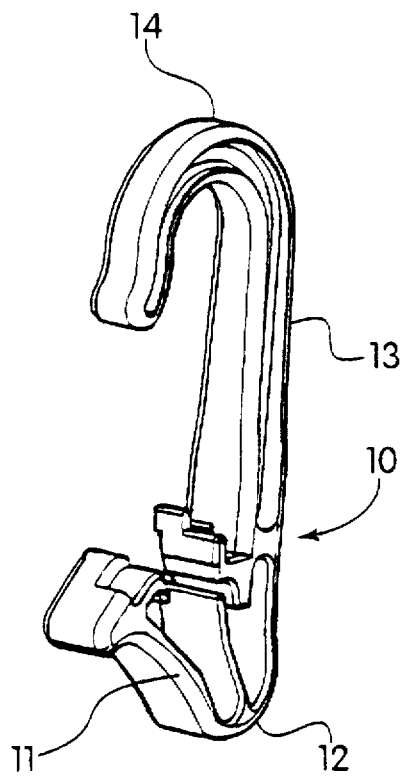
FIG. 1 is a perspective view of the hook according to the invention.
Figure 2:
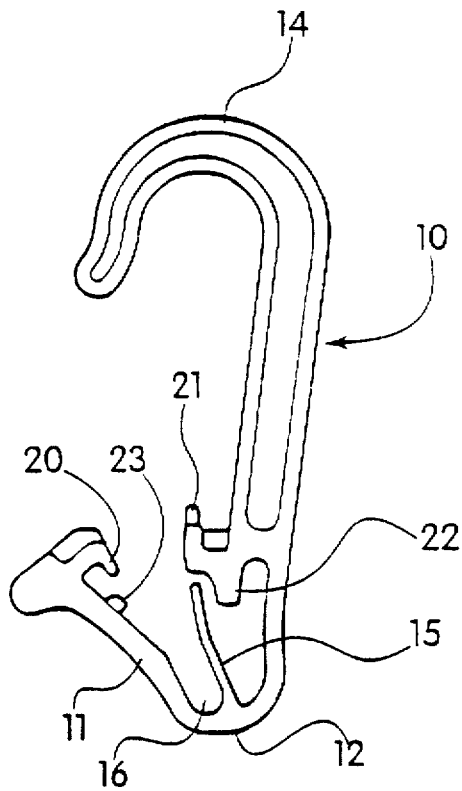
FIG. 2 is a right side view of the hook according to the invention.
Figure 3:
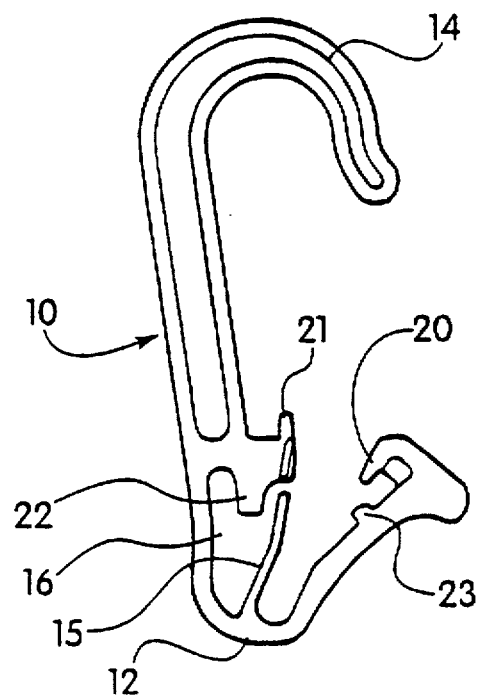
FIG. 3 is a left side view of the hook according to the invention.
Figure 4:
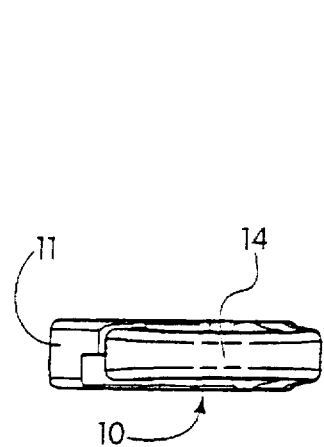
FIG. 4 is a top view of the hook according to the invention.
Figure 5:
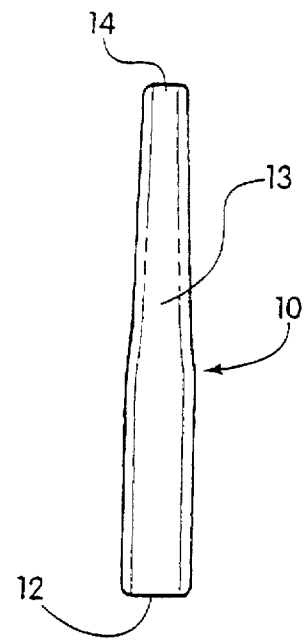
FIG. 5 is a rear view of the hook according to the invention.

Turning now in detail to the drawings, and in particular, FIGS. 1-5, there is shown several views of the hook according to the invention, having a hook body 10 attached to a latch 11. Hook body 10 is comprised of base 12, side 13 and curved top portion 14. Latch 11 is integrally formed with base 12 and extends upward toward top portion 14.

An upwardly extending flexible member 15 is attached to base 12 in between hook body 10 and latch 11. Along with latch 11, flexible member 15 forms a space 16 for placing the cord to be secured by the hook. Flexible member 15 may also be attached to hook body 10 at its upper end as well.

Figure 6:
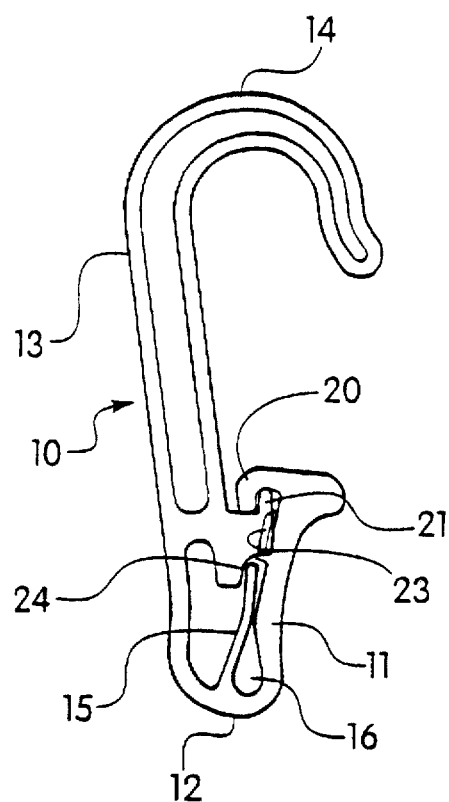
FIG. 6 is a left side view of the hook shown in FIG. 3 in the locked position.

Latch 11 has a downwardly-extending finger 20 formed at its free end for locking latch 11 to hook body 10. To engage finger 20, upwardly-extending protrusion 21 is mounted at an intermediate section of hook body 10. The hook is formed from a resilient material such as nylon or acetal so that latch 11 can be bent toward hook body 10 and locked onto hook body 10 by forcing finger 20 over protrusion 21, as shown in FIG. 6. Latch 11 can be released from hook body 10 to relocate the hook in a different place by pressing the free end of latch 11 away from hook body 10, with sufficient force to release finger 20 from protrusion 21. Other means for securing latch 11 to hook body 10 could also be envisioned.

The inside face of latch 11 has a protrusion 23 which prevents latch 11 from sliding out of engagement with hook body 10 if latch 11 is twisted or laterally moved while in engagement with hook body 10.

To prevent flexible member 15 from moving too far back toward hook body 10, stop 22 is formed on hook body 10. Stop 22 contacts the top of flexible member 15 and prevents it from moving beyond a certain distance when latch 11 is locked into hook body 10. Stop 22 ensures that space 16 is of an appropriate size so as to securely fit around a flexible cable, such as the bungee cords along the top of automobile cargo nets.

Figure 7:
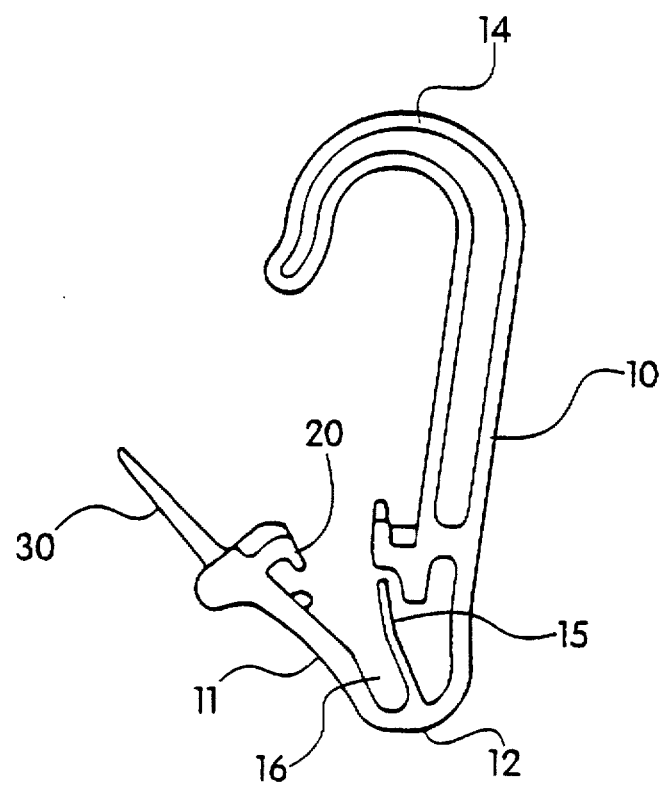
FIG. 7 is a right side view of another embodiment of the hook according to the invention.

FIG. 7 shows an alternate embodiment of the invention, in which a tongue 30 is attached to the free end of latch 11 and extends upward from latch 11. Tongue 30 serves to prevent the inadvertent disengagement of hook body 10 while it is hooked over a bar, beam or cable.

Figure 8:
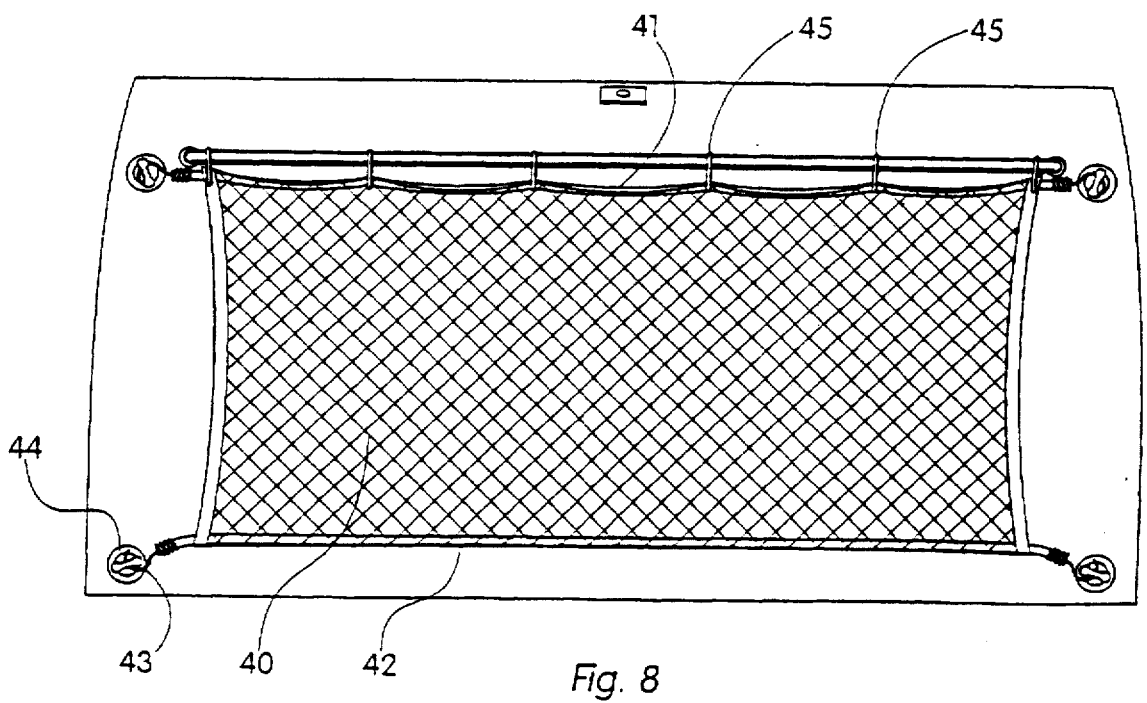
FIG. 8 is a front view of an automobile cargo net and hook assembly according to the invention.

The hooks according to the invention can be used for a variety of applications, but are especially adapted for use in conjunction with automobile cargo nets. FIG. 8 shows an automobile cargo net equipped with a plurality of hooks according to the invention. Net 40 is supported by upper cord 41 and lower cord 42. Cords 41 and 42 end in loops 43, which are looped around brackets 44 to attach net 40 to the automobile.

Hooks 45 are attached to cord 41 at spaced intervals along cord 41. Hooks 45 operate in the manner indicated above, with respect to FIGS. 1-7, and serve to attach cord 41 to other surfaces of the car, or to other objects. Hooks 45 are easily mounted on cord 41 and keep cord 41 from sagging and releasing the contents of net 40.

Accordingly, while only several embodiments of the present invention have been shown and described, it is obvious that many changes and modifications may be made thereunto without departing from the spirit and scope of the invention according to the appended claims.

What is claimed is:

1. A hook adapted to be attached to an elongated cord, comprising:

a hook body having a base, a side and a curved top portion;

a latch having a first end and a second end, the first end being attached to the base;

means for releasably locking the second end of the latch to the hook body;

a flexible member extending upward from the base in between the side of the hook body and the latch, said latch and said flexible member defining a space in which the cord is placed;

wherein locking the latch to the hook body traps the cord in the space between the flexible member and the latch.

2. The hook according to claim 1, wherein the means for releasably locking the latch to the hook body comprises:

an upwardly-extending protrusion attached to the side of the hook body; and a downwardly-extending finger attached to the second end of the latch, such that pressing the latch toward the hook body causes the finger to engage the protrusion and secure the latch to the hook body.

3. The hook according to claim 1, further comprising a tongue attached to the second end of the latch and extending upward toward the curved portion.

4. The hook according to claim 1, wherein the hook is made from a single piece of injection-molded elastomeric material.

5. The hook according to claim 1, wherein the flexible member has two ends, wherein both ends are connected to the hook body.

6. A hook adapted to be attached to an elongated cord, comprising:

a hook body having a base, a side and a curved top portion;

a latch having a first end and a second end, the first end being attached to the base;

means for releasably locking the second end of the latch to the hook body;

a flexible member extending upward from the base in between the side of the hook body and the latch, said flexible member having a free end, and said latch and said flexible member defining a space in which the cord is placed;

wherein locking the latch to the hook body traps the cord in the space between the flexible member and the latch.

7. The hook according to claim 6, wherein the means for releasably locking the latch to the hook body comprises:

an upwardly-extending protrusion attached to the side of the hook body; and a downwardly-extending finger attached to the second end of the latch, such that pressing the latch toward the hook body causes the finger to engage the protrusion and secure the latch to the hook body.

8. The hook according to claim 6, further comprising a stop mounted on the hook body and adapted to stop movement of the flexible member toward the hook body when the latch is pressed toward the hook body, so that locking the latch to the hook body compresses the space between the flexible member and the latch.

9. The hook according to claim 6, further comprising a tongue attached to the second end of the latch and extending upward toward the curved portion.

10. The hook according to claim 6, wherein the hook is made from a single piece of injection-molded elastomeric material.

11. An automobile cargo net having an edge and flexible cord mounted along the edge of the net, and comprising:

a plurality of hooks mounted on the flexible cord along the edge of the cargo net, each hook comprising:
- a hook body having a base, a side and a top curved portion;
- a latch having a first end and a second end, the first end attached to the base portion;
- means for releasably locking the second end of the latch to the hook body;
- a flexible member extending upward from the base in between the side of the hook body and the latch, said flexible member and said latch defining a space in which the cord is placed;

wherein locking the latch to the hook body traps the cord in the space between the flexible member and the latch.

* * * * *